Oct. 2, 1928.

G. J. THOMAS 1,686,111

BRAKE OPERATING MEANS

Filed Feb. 4, 1927

INVENTOR
GEORGE J. THOMAS
BY
M. W. McConkey
ATTORNEY

Patented Oct. 2, 1928.

1,686,111

UNITED STATES PATENT OFFICE.

GEORGE J. THOMAS, OF SOUTH BEND, INDIANA, ASSIGNOR TO BENDIX BRAKE COMPANY, OF CHICAGO, ILLINOIS, A CORPORATION OF ILLINOIS.

BRAKE-OPERATING MEANS.

Application filed February 4, 1927. Serial No. 165,794.

This invention relates to mechanisms such as brakes, and is illustrated as embodied in novel operating means for a front-wheel automobile brake of the internal expanding type.

An object of the invention is to provide a very rigid and strong, but inexpensive, support for a brake-operating shaft or the like. Preferably the shaft is journalled in spaced bearings formed by integrally drawing out sleeves in a pair of stampings secured to the backing plate. Various features of novelty relate to the formation and arrangement of such stampings to give the greatest possible rigidity to the shaft.

The above and other objects and features of the invention, including various desirable and novel details of construction, will be apparent from the following description of one illustrative embodiment shown in the accompanying drawing, in which.

Figure 1:
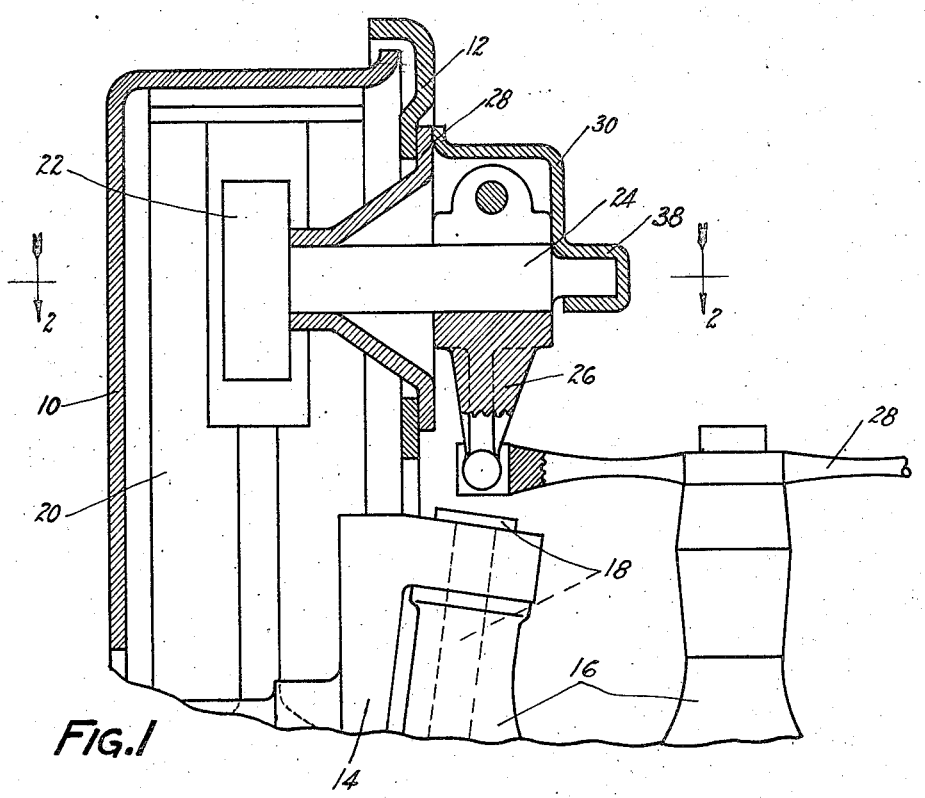
Figure 1 is a partial vertical section through the upper part of one front brake, showing the novel shaft support in vertical section.
Figures 2, 3:
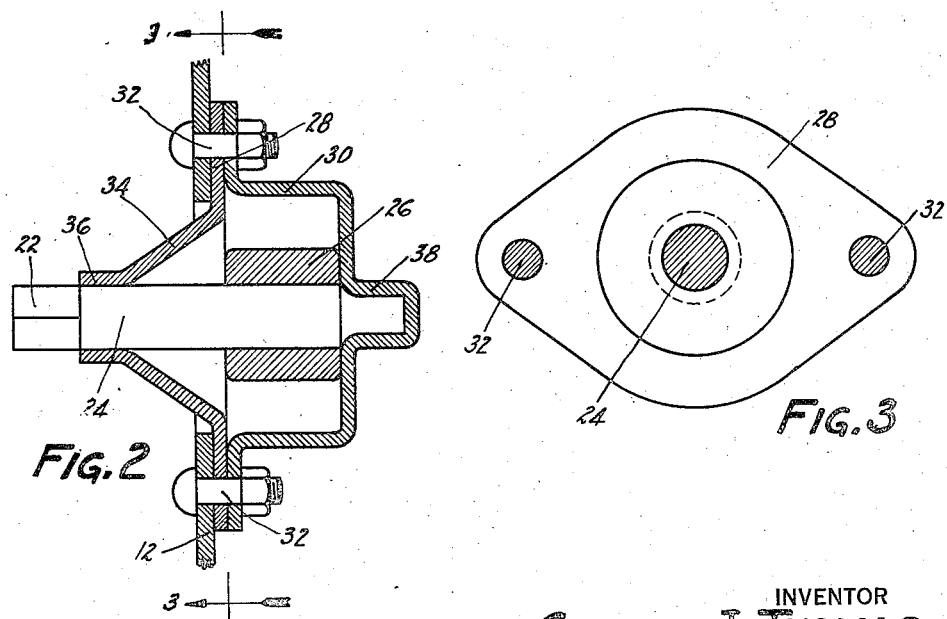
Figure 2 is a horizontal section through the support, on the line 2—2 of Figure 1.
Figure 3 is a section through the support on the line 3—3 of Figure 2.

The brake illustrated in the drawing includes a drum 10, rotating with a wheel (not shown), and at the open side of which is the usual brake backing plate 12 secured in any desired manner (not shown) to the front wheel knuckle 14. Knuckle 14 is swiveled to the front axle 16 by a suitable king pin 18.

The brake proper includes shoes 20, or equivalent friction means, within the drum 10, applied by means such as a double cam 22 secured to, or integral with, a shaft 24 which is rocked in applying the brake by an arm 26 engaged by a lever 28 fulcrumed on axle 16. The joint between arm 26 and lever 28, when the brake is applied, is just above king pin 18, so that the brake does not interfere with steering the automobile.

The present invention relates to the novel means for supporting shaft 24. In one desirable arrangement there are two stampings 28 and 30, preferably both outside the backing plate 12, and which are arranged with their margins engaging each other and the backing plate, and secured to the backing plate by fastenings such as bolts 32 on opposite sides of shaft 24.

Stamping 28 is drawn out inside its margin to form a conical section 34 projecting through an opening in the backing plate, and terminating in a tubular or cylindrical sleeve 36 in which shaft 24 is journalled immediately adjacent cam 22, and which forms an integrally-drawn bearing for the shaft.

Stamping 30 is offset away from stamping 28, just inside its margin, to form a cup-shaped portion clearing the arm 26, and is formed at its center with an integrally-drawn tubular sleeve or boss 38, which is coaxial with respect to sleeve 36, and in which the end of shaft 24 (shown as being of reduced diameter) is journalled, and which forms a bearing for the shaft spaced a considerable distance from bearing 36, thus giving great rigidity to the shaft.

While one illustrative embodiment has been described in detail, it is not my intention to limit the scope of the invention to that particular embodiment, or otherwise than by the terms of the appended claims.

I claim:

1. Brake-operating means comprising, in combination, a backing plate formed with an opening, a brake-applying shaft passing through said opening, a pair of stampings formed with coaxial integrally-drawn sleeves in which said shaft is journalled, and means for securing said stampings to the backing plate.

2. Brake-operating means comprising, in combination, a backing plate formed with an opening, a brake-applying shaft passing through said opening, a pair of stampings arranged on the same side of the backing plate and formed with coaxial integrally-drawn sleeves in which said shaft is journalled, and means for securing said stampings to the backing plate.

3. Brake-operating means comprising, in combination, a backing plate formed with an opening, a brake-applying shaft passing through said opening, a pair of stampings at least one of which is arranged on the outer side of the backing plate and which are formed with coaxial integrally-drawn sleeves in which said shaft is journalled, and means for securing said stampings to the backing plate.

4. Brake-operating means comprising, in combination, a backing plate formed with an opening, a brake-applying shaft passing through said opening, a pair of stampings both of which are arranged on the outer side of the backing plate and which are formed with coaxial integrally-drawn sleeves in which said shaft is journalled, and means for securing said stampings to the backing plate.

5. Brake-operating means comprising, in combination, a backing plate formed with an opening, a brake-applying shaft passing through the opening, a pair of stampings having spaced-apart coaxial bearings for said shaft, and fastenings on opposite sides of the shaft for securing the stampings to the backing plate.

6. Brake-operating means comprising, in combination, a backing plate formed with an opening, a brake-applying shaft passing through the opening, a pair of stampings having spaced-apart coaxial bearings for said shaft, the stampings being deflected at their ends into engagement with each other and with the backing plate, and fastenings for securing said ends of the stampings to the backing plate.

7. Brake-operating means comprising, in combination, a backing plate, a shaft, a stamping having its margin adjacent the backing plate and formed with a generally conical portion inside the margin and with a tubular bearing at the end of the conical portion and in which the shaft is journalled, a second stamping having its margin adjacent the margin of the first stamping and thence offset away from the first stamping and having at its central part a tubular bearing coaxial with the first bearing and in which the shaft is also journalled, and means for securing said margins to the backing plate.

8. Brake-operating means comprising, in combination, a backing plate, a shaft, a stamping formed with a generally conical portion and with a tubular bearing at the end of the conical portion and in which the shaft is journalled, a second stamping having at its central part a tubular bearing coaxial with the first bearing and spaced therefrom and in which the shaft is also journalled, and means for securing said stampings to the backing plate.

In testimony whereof, I have hereunto signed my name.

GEORGE J. THOMAS.